(12) United States Patent
Son

(10) Patent No.: US 10,708,212 B1
(45) Date of Patent: *Jul. 7, 2020

(54) STORAGE AND PROCESSING OF EPHEMERAL MESSAGES

(71) Applicant: Snap Inc., Santa Monica, CA (US)

(72) Inventor: Aaron Son, Venice, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/362,827

(22) Filed: Mar. 25, 2019

Related U.S. Application Data

(63) Continuation of application No. 15/829,582, filed on Dec. 1, 2017, now Pat. No. 10,284,509, which is a continuation of application No. 15/434,807, filed on Feb. 16, 2017, now Pat. No. 10,097,497, which is a continuation of application No. 14/615,553, filed on Feb. 6, 2015, now Pat. No. 9,294,425.

(51) Int. Cl.
*H04L 12/58* (2006.01)

(52) U.S. Cl.
CPC .............. *H04L 51/22* (2013.01); *H04L 51/16* (2013.01); *H04L 51/18* (2013.01)

(58) Field of Classification Search
CPC ......... H04L 51/04; H04L 51/18; H04L 51/34; H04L 51/36; G06Q 10/107
See application file for complete search history.

(56) References Cited

U.S. PATENT DOCUMENTS

| 5,418,528 | A | * | 5/1995 | Hosack | ................ | G08B 5/227 |
| | | | | | | 340/4.3 |
| 5,915,004 | A | * | 6/1999 | Pabbati | ................ | H04L 51/22 |
| | | | | | | 379/100.08 |
| 6,088,516 | A | * | 7/2000 | Kreisel | ................ | G06F 8/63 |
| | | | | | | 709/221 |
| 6,324,569 | B1 | * | 11/2001 | Ogilvie | ................ | G06Q 10/107 |
| | | | | | | 709/206 |
| 8,144,714 | B1 | * | 3/2012 | Buchko | ................ | H04L 51/30 |
| | | | | | | 370/229 |
| 8,347,021 | B1 | * | 1/2013 | Phillips | ................ | G06F 11/3612 |
| | | | | | | 711/100 |
| 8,364,764 | B2 | * | 1/2013 | Hartselle | ................ | G06Q 10/107 |
| | | | | | | 709/205 |
| 9,294,425 | B1 | * | 3/2016 | Son | ................ | H04L 51/18 |

(Continued)

*Primary Examiner* — Alina A Boutah
(74) *Attorney, Agent, or Firm* — Culhane Meadows PLLC; Stephen J. Weed

(57) ABSTRACT

A server includes volatile and non-volatile memories for storing messages received from a client device. A message reception module of the server stores a message received from a first client device in the volatile memory for an extended time period based on an indicator included in the message. The message reception module deletes the message from the volatile memory based on detection of a triggering event or stores the message in the non-volatile memory based on not detecting the triggering event before the extended time period has expired. The triggering event may include the message having been read by all specified recipients of the message. The indicator may be included in the message based on a relationship of the message to other messages. The message including the indicator may be related to other messages as part of a same conversation that has been determined to be suitable for short-term storage.

9 Claims, 8 Drawing Sheets

(56) References Cited

U.S. PATENT DOCUMENTS

| | | | |
|---|---|---|---|
| 9,596,577 B1* | 3/2017 | Donohue | H04W 4/12 |
| 10,284,509 B1* | 5/2019 | Son | H04L 51/18 |
| 2002/0112007 A1* | 8/2002 | Wood | G06Q 10/107 |
| | | | 709/206 |
| 2003/0135573 A1* | 7/2003 | Taylor | H04L 51/30 |
| | | | 709/207 |
| 2004/0103161 A1* | 5/2004 | Matsumoto | H04L 51/28 |
| | | | 709/206 |
| 2005/0060374 A1* | 3/2005 | Phillips | G06F 9/546 |
| | | | 709/206 |
| 2005/0190898 A1* | 9/2005 | Priest | H04M 3/42008 |
| | | | 379/88.18 |
| 2006/0031330 A1* | 2/2006 | Ruiz | G06Q 30/0217 |
| | | | 709/206 |
| 2006/0105740 A1* | 5/2006 | Puranik | H04M 3/16 |
| | | | 455/410 |
| 2006/0168028 A1* | 7/2006 | Duxbury | H04L 51/12 |
| | | | 709/206 |
| 2007/0015497 A1* | 1/2007 | Patel | H04M 3/48 |
| | | | 455/418 |
| 2007/0130255 A1* | 6/2007 | Wolovitz | H04L 51/38 |
| | | | 709/204 |
| 2008/0048908 A1* | 2/2008 | Sato | B60R 16/0373 |
| | | | 342/200 |
| 2009/0292777 A1* | 11/2009 | Jackson | H04L 29/12273 |
| | | | 709/206 |
| 2010/0267402 A1* | 10/2010 | Avasarala | G06Q 10/107 |
| | | | 455/466 |
| 2011/0231499 A1* | 9/2011 | Stovicek | H04M 1/72547 |
| | | | 709/206 |
| 2012/0209921 A1* | 8/2012 | Adafin | H04L 51/30 |
| | | | 709/206 |
| 2014/0032682 A1* | 1/2014 | Prado | H04L 51/34 |
| | | | 709/206 |
| 2015/0215970 A1* | 7/2015 | Bruel | H04W 76/10 |
| | | | 370/329 |
| 2015/0288633 A1* | 10/2015 | Ogundokun | H04L 51/12 |
| | | | 709/206 |
| 2016/0028660 A1* | 1/2016 | Weishaupl | H04L 51/04 |
| | | | 709/206 |

* cited by examiner ion Ser. No. 15/829,582, filed Dec. 1, 2017, which is a continuation of U.S. application Ser. No. 15/434,807, filed Feb. 16, 2017, now issued as U.S. Pat. No. 10,097,497, which is a continuation of U.S. application Ser. No. 14/615,553, filed Feb. 6, 2015, now issued as U.S. Pat. No. 9,294,425, all of which are incorporated herein by reference in their entirety.
STORAGE AND PROCESSING OF EPHEMERAL MESSAGES

CROSS-REFERENCE TO RELATED APPLICATIONS

This application is a continuation of U.S. applicat

TECHNICAL FIELD

The subject matter disclosed herein generally relates to generating and distributing electronic messages. More specifically, the present disclosure describes systems and methods for the temporary back-end storage and automatic deletion of certain "ephemeral" messages, e.g., messages that may only be viewed by recipients for a specified period of time and are deleted afterwards.

BACKGROUND

Electronic communications, such as e-mail or text messages, images, video, multimedia, etc., over networks, such as the Internet, can be a very convenient means of communication. However, security concerns can limit the appeal of such communications. For example, while encryption may provide a degree of privacy and security for a message while in transit, once the message is received by recipients, the sender of the message typically loses control over how the message is dealt with by the recipients. For example, a message sender may only wish the recipient to be in possession of the message for a specific period of time, but the recipient may choose to retain the message in his or her message store beyond that period. Ephemeral messages set to be automatically deleted after a specific trigger event or a specified period of time may be used to address this concern and therefore efficient systems and methods for processing the temporary data of such ephemeral messages are desirable.

BRIEF DESCRIPTION OF THE DRAWINGS

The present disclosure is illustrated by way of example, and not by way of limitation, in the figures of the accompanying drawings, in which.

DETAILED DESCRIPTION

Although the present disclosure is described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense.

A messaging system may provide a message sender with additional control over electronic messages, such as text messages or photos, after they have been received by a recipient. The embodiments described herein provide systems and methods for processing ephemeral messages intended for automatic deletion after receipt or upon consumption of the message by a recipient. These embodiments will be described in relation to mobile wireless communication devices, hereafter referred to as client devices, for sending and receiving electronic messages such as text messages, photos or videos, and associated servers for receiving and forwarding messages to and from the client devices. It will be appreciated by those skilled in the art, however, that this description is not intended to limit the scope of the described embodiments to the communication devices described below or to any specific electronic message formats. The methods and systems described herein may be applied to any appropriate communication or data processing device and to any appropriate electronic communication format.

Overview

Figure 1:
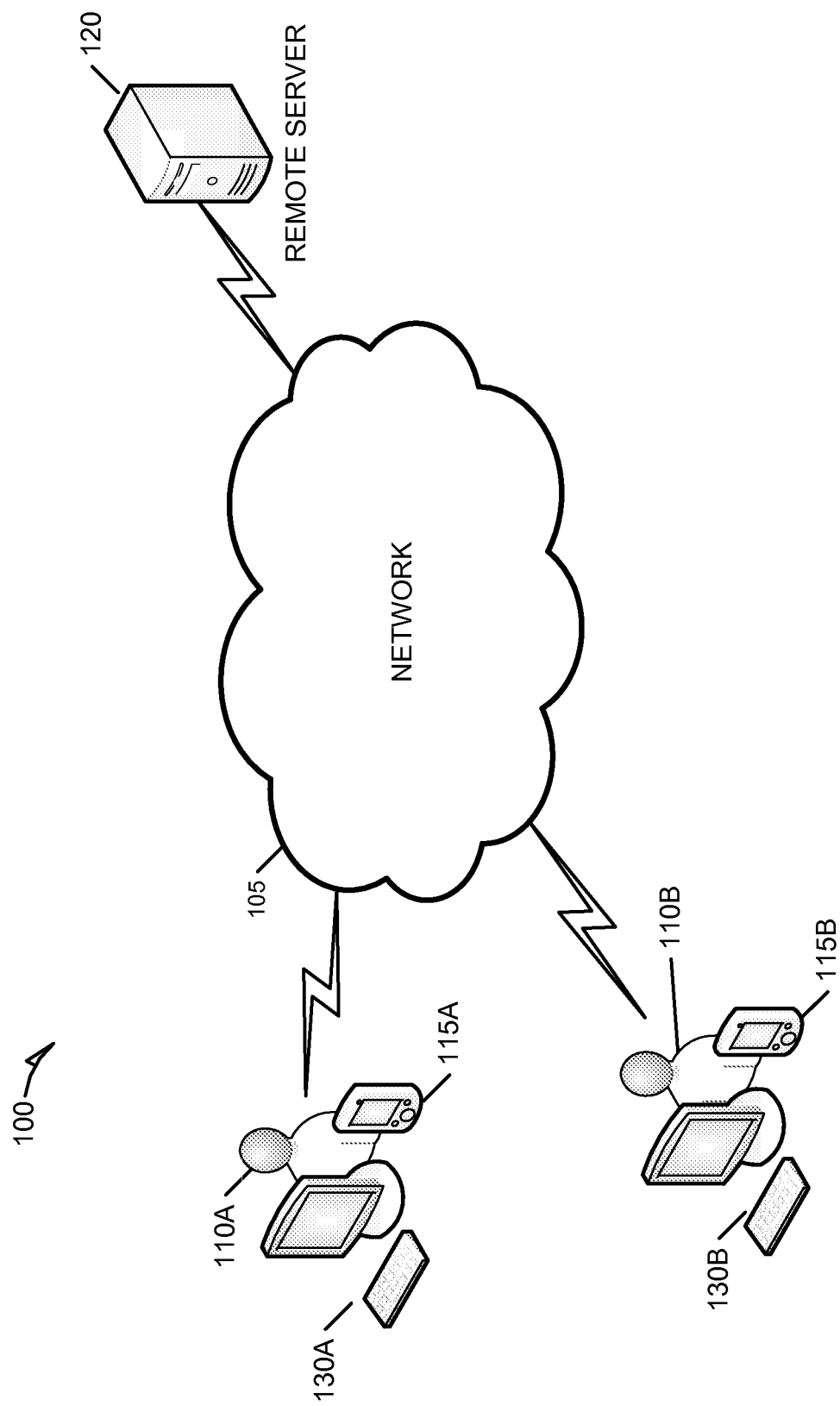
FIG. 1 is a block diagram showing a network system configured to transmit messages over a network consistent with some embodiments.

FIG. 1 is a block diagram showing a network system 100 configured to transmit messages over a network 105 (e.g., the internet) consistent with some embodiments. In an embodiment, a remote server 120 includes non-durable (e.g., volatile) and durable (e.g., non-volatile) memories for storing ephemeral messages received from a client device. The messages may be stored in the non-durable memory for a time period before being copied to the durable memory so that messages that are quickly read by the recipients (e.g., within the time period) may simply be deleted from the non-durable memory without having been copied to the durable memory. The client device may be a mobile device 115A or a more static device 130A (e.g., a desktop computer) of a user 110A of network 105. The remote server 120 may store a message received from first client device 115A in the non-durable memory for an extended time period (compared to the time period) based on an indicator in the message that signals that the message may only need to be stored for a short time. For example, if the message is in the form of a body and a header, a field indicating that the message is to be stored in non-durable memory for an extended time period may be inserted into the header, such as "short-term: yes". The message may be processed normally (stored in the non-durable memory for the standard time period), based on the field being omitted, or the field containing the value "no". In this way messages that are likely to be deleted shortly, but possibly not before the standard time period expires, may never have to be stored in the durable memory avoiding further storage and processing overhead. For example, the remote server 120 may delete the message from the non-durable memory (without ever writing it to the durable memory) based on detection of a triggering event, such as the message being read by all of the recipients of the message, between the end of the standard time period and the end of the extended time period. The basic reasoning being that if a deletion triggering event is expected to be received shortly for a message, the message may be considered a "short-term" message and stored in the non-durable memory for an extended period of time.

The "short-term" indicator may be included in the message based on many factors, such as a count of messages related to the message since a large conversation may indicate a rapid back and forth of messages; a size of the message since a large message is unlikely to be quickly read and/or responded to; a recipient of the message since certain recipients may have an estimated response time; or a subject of the message since certain subjects may be associated with estimated response times. Furthermore, the "short-term" indicator may result in different extended time period durations depending on the basis for the inclusion of the indicator.

In an embodiment, the indicator may be included in the message based on a relationship between the message and another recently processed message. For example, the indicator may be inserted based on the message being part of a same conversation as another message, where the other message was deleted within the extended time period. Other relationships may also be detected, such as a same sender, receiver or subject of the messages. In this way an entire set of related messages may only ever be stored in non-durable memory for a more efficient processing of "short-term" groups of messages such as conversations where messages are being quickly sent back and forth between two users 110A and 110B of client devices 115A and 115B. The remote server 120 may eventually copy the message from client device 115A to the durable memory based on not detecting the triggering event (e.g. being read by user 110B of client device 115B) before the extended time period has expired.

In some embodiments, the "short-term" indicator may be included in the message based on, for example, a mode of operation of the client device 115A such as a "chatroom" mode for synchronous communications between two users 110A and 110B. In chatroom mode the messages are expected to be deleted shortly (and therefore may be considered "short-term" messages) because chatroom messages are deleted when either of users 110A and 110B leaves the chatroom. In some embodiments, user 110A of client device 115A might receive a warning (from remote server 120) upon initiating chatroom mode noting that any messages sent (and/or received) in this mode will be automatically deleted (from the remote sever 120) upon exiting from chatroom mode, e.g., a chatroom participant leaves the chatroom.

In an embodiment, the remote server 120 transmits the message from the first client device 115A to a second client device 115B associated with a recipient 110B of the message upon receipt of a request from said second client device 115B. The request could, for example, be automatic upon launching a messaging application on the second client device 115B. The remote server 120 may insert instructions in the message to instruct the second client device 115B to store the message in memory for only a specified time period and/or to display the message for only a specified time period (e.g., specified by the mode of operation of the client device) so that the messages are "ephemeral" messages. The remote server 120 may then delete the message from whichever of the server memories (durable and non-durable) it is currently stored on based on the specified time period expiring. In some embodiments, the message may also be stored on the client device 115B but subsequently deleted (e.g., after being read by the recipient and after expiration of a set amount of time).

Figure 2:
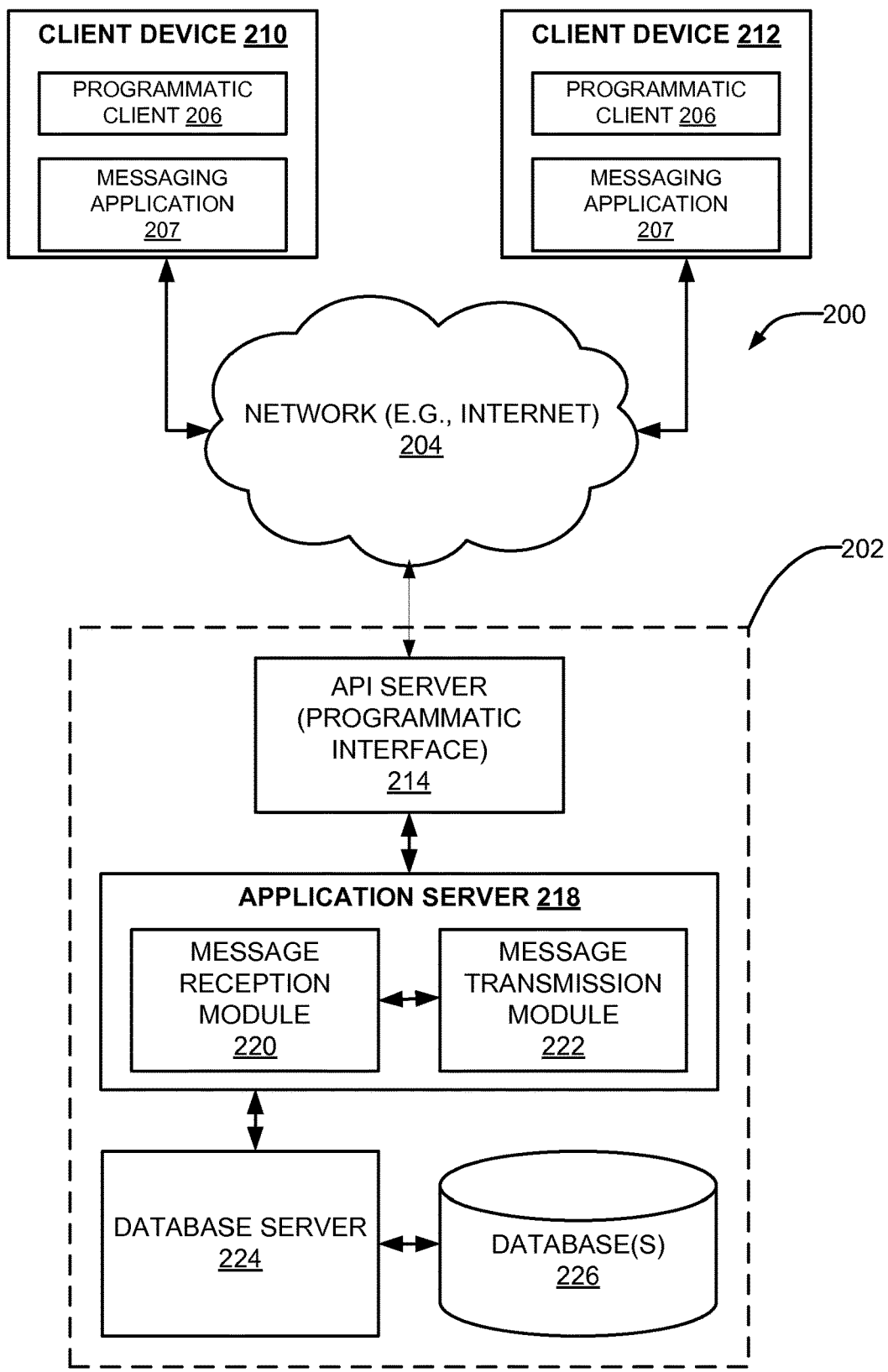
FIG. 2 is a block diagram illustrating an example of a network environment including a server operating a system for processing and storing messages for users of client devices, consistent with some embodiments.

In an embodiment, the triggering event for deleting a message comprises responding to the message at the second client device 115B prior to the expiration of the specified time period, for example, by sending a return message prior to the expiration of the specified time period without closing the messaging application. Furthermore, any response to the message may also include the indicator based on being related to the message as part of a same conversation and therefore being related to a message that includes the indicator System Architecture FIG. 2 is a network diagram depicting a network system 200 having a client-server architecture configured for exchanging data over a network, according to one embodiment. For example, the network system 200 may be a messaging system where clients may communicate and exchange data within the network system 200. The data may pertain to various functions (e.g., sending and receiving text, photo and video communications) and aspects (e.g., publication of blogs and websites) associated with the network system 200 and its users. Although illustrated herein as client-server architecture, other embodiments may include other network architectures, such as peer-to-peer or distributed network environments.

A data exchange platform 202, in an example, includes a message reception module 220 and a message transmission module 222, and may provide server-side functionality via a network 204 (e.g., the Internet) to one or more clients. Although described as residing on a server (e.g., application server(s) 218) in some embodiments, in other embodiments some or all of the functions of message reception module 220 and message transmission module 222 may be provided by a client device. The one or more clients may include users that use the network system 200 to exchange data over the network 204. These operations may include transmitting, receiving (communicating), and processing data to, from, and regarding content and users of the network system 200. The data may include, but is not limited to, content and user data such as user profiles, messaging content, messaging attributes, client device information, and geolocation information, among others.

In various embodiments, the data exchanges within the network system 200 may be dependent upon user-selected functions available through one or more client or user interfaces (UIs). The UIs may be associated with a client machine, such as client devices 210, 212 using a programmatic client 206, such as a client application. The programmatic client 206 may be in communication with the message reception module 220 and message transmission module 222 via an application server 218. The client devices 210, 212 may comprise mobile devices with wireless communication components and applications for sending specific types of electronic messages (e.g., ephemeral messages) over network 204 (e.g., messaging application 207).

Turning specifically to the message reception module 220 and the message transmission module 222, an application program interface (API) server 214 is coupled to, and provides programmatic interface to one or more application server(s) 218 that host the message reception module 220 and the message transmission module 222. The application server 218 is, in turn, shown to be coupled to one or more database servers 224 that facilitate access to one or more database(s) 226. The one or more database(s) 226 may include durable storage (e.g., non-volatile memory) and non-durable storage (e.g., volatile memory).

The API server 214 communicates and receives data pertaining to messages, among other things, via various user input tools. For example, the API server 214 may send and receive data to and from an application (e.g., via the programmatic client 206) running on another client machine (e.g., client devices 210, 212 or a third-party server).

In one example embodiment, the message reception module 220 provides messaging functionality for users of the client devices 210, 212 to send ephemeral messages that automatically disappear after a triggering event has been detected, for example the messages have been viewed by the recipient for a specified period of time. The client devices 210, 212 can access and view the messages via the application server(s) 218 which may access the message content from, for example, the database(s) 226.

In one example embodiment, the message reception module 220 stores a message received from a first client device 210 in a volatile memory (e.g., of application server(s) 218 or database(s) 226) for an extended time period based on a "short-term" indicator included in the message that signals that the message may only need to be stored for a short time. For example, if the message would normally be stored in the volatile memory and then persisted to the non-volatile memory after 15 minutes (e.g., standard time period), then based on the inclusion of the "short-term" indicator in the message, it might remain in volatile storage for a longer extended time period (e.g., an hour or more) because it is expected that a triggering event resulting in the deletion of the message may soon be received, e.g., before the extended time period expires. In this way messages that are likely to be deleted shortly (e.g., messages that include the "short-term" indicator) never have to be stored in the non-volatile memory, therefore avoiding further storage and processing overhead. For example, the message reception module 220 may delete the message from a volatile memory of database(s) 226 (without ever persisting it to the non-volatile memory) based on detection of a triggering event such as the message having been read by all of the specified recipients of the message. The message may be processed normally (stored in the non-durable memory for the standard time period), based on the indicator not being included in the message.

The "short-term" indicator may be included in the message based on many factors, such as a count of messages related to the message (e.g., if the related message count is larger than a threshold amount then include the indicator) since a large conversation may indicate a rapid back and forth of messages; a size of the message (e.g., if the message is larger than a threshold size then do not include the indicator) since a large message is unlikely to be quickly read and/or responded to; a recipient of the message (e.g., if the message recipient is X then include or do not include the indicator) since certain recipients may have an estimated response time; or a subject of the message (e.g., if the message subject is X then include or do not include the indicator) since certain subjects may be associated with estimated response times. Furthermore, the "short-term" indicator may result in different extended time period durations depending on the basis for the inclusion of the indicator.

In an embodiment, the indicator may be included in the message based on a relationship of the message to other messages processed by application server(s) 218. For example, the message may be related to at least one message that has been deleted (e.g., based on detection of a triggering event) that has been deleted within the extended time period. The relationship between the messages may be that they are related as part of a same conversation. In this way an entire set of related messages may only ever be stored in volatile memory (without being copied to non-volatile memory) for a more efficient processing of "short-term" groups of messages such as conversations where messages are being quickly sent back and forth between two users 110A and 110B of client devices 210 and 212. The message reception module 220 may then copy the message to the non-volatile memory (e.g., in application server(s) 218 or database(s) 226) based on not detecting any triggering event before the extended time period has expired.

In some embodiments, the indicator may be included in the message based on, for example, a mode of operation of the messaging application 207 of client device 210 such as a "chatroom" mode for synchronous communications between two users 110A and 110B of client devices 210 and 212. The user of client device 210 might receive a warning (e.g. from message reception module 220) upon initiating chatroom mode noting that messages sent (and/or received) in this mode will be automatically deleted (from application server(s) 218 or from client devices 210 and 212) upon exiting from chatroom mode, e.g., a chatroom participant leaves the chatroom.

The message transmission module 222 may transmit the message received from the first client device 210 to a second client device 212 associated with a recipient of the message upon receipt of a request from said second client device 212. The request could, for example, be automatic upon launching a messaging application 207 on the second client device 212. The message transmission module 222 may insert instructions in the message to instruct the second client device 212 not to store the message in memory and to only display the message for a specified time period (e.g., specified by the mode of operation of messaging application 207 of client device 210) so that the messages are "ephemeral" messages. The message transmission module 222 may then delete the message from whichever of the memories of application server(s) 218 and/or database(s) 226 (durable and/or non-durable) the message is currently stored on based on the expiration of the specified time period. In some embodiments, the message may also be stored on the client device 212 but subsequently deleted (e.g., after being read by the recipient and after expiration of a set amount of time).

In an embodiment, the triggering event for deleting a message comprises a responding to the message at the client device 212 prior to the expiration of the specified time period, for example, by sending a return message prior to the expiration of the specified time period without closing the messaging application 207. Furthermore, any response to the message may also include the indicator based on being related to the message as part of a same conversation and therefore being related to a message that includes the indicator.

User Interface

Figure 3:
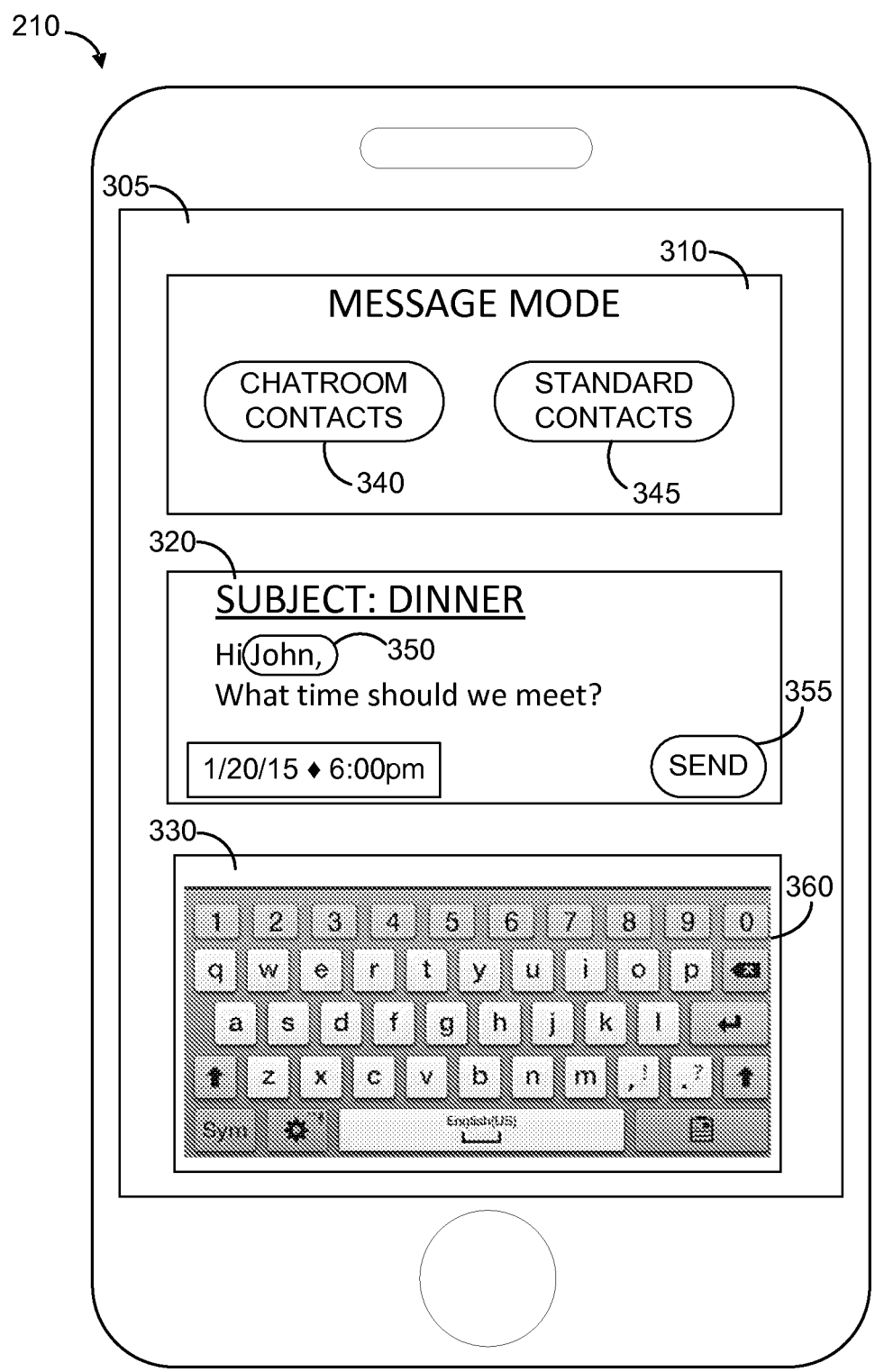
FIG. 3 is a display diagram illustrating messaging user interface options provided to a user of a mobile client device.

FIG. 3 is a display diagram illustrating messaging user interface options provided to a user (e.g., 110A) of a client device 210 in the form of a mobile computing device. As shown in FIG. 3, client device 210 including a display 305 and at least one processor may send and/or receive a communication from the message reception module 220 or the message transmission module 222 via the application server(s) 218, for example, a communication initiating a short conversation with another client device of the application server(s) 218. The client device 210 may present to a user, via user interface objects that may be generated by the messaging application 207 (e.g., user interface objects 310, 320 and 330 on the display 305), options associated with sending and receiving messages via application server(s) 118. As explained above, message reception module 220 of application server(s) 118 stores a message received from client device 210 in non-durable memory (e.g., in database(s) 226) for an extended time period based on an indicator included in the message. In this way messages that are likely to be deleted shortly (e.g., a short conversation about when to meet for dinner) never have to be stored in the durable memory avoiding further storage and processing overhead for data exchange platform 202.

In the example of FIG. 3, a user 110A of a client device 210 may launch messaging application 207 for the purpose of sending an ephemeral message to another client device 212 of application server(s) 218. The user 110A may then be presented with a selection of messaging modes via a user interface object 310 which provides message mode options 340 and 345 for user selection. A chatroom mode may be available via option 340 to be used for synchronous communications between users, while a standard mode may be available via option 345. In the example, a selection of option 340 or option 345 will launch separate contact lists associated with each message mode, although the reverse process could also be used so that selecting a contact (via a contact list) that is associated with a message mode will trigger the associated message mode. A "short-term" indicator may be included in the message based on many other factors. For example, the indicator may be included in the message based on a recognized subject typed into the subject line displayed in user interface object 320 via the keyboard 370 of user interface object 330. Other factors, such as a recipient of the message as displayed via display object 350 of user interface object 330 may also be used. Furthermore, any response to the chatroom mode message in the chatroom will also include the indicator based on being part of the same conversation as the original chatroom mode message.

In the example of FIG. 3, a user 110A of a client device 210 may input a command to send the message via user option 355 of user interface object 320 and this will result in the message being transmitted from the client device 210 to the message reception module 220 of application server(s) 218. The message will then be stored in a non-durable memory for an extended period of time based on the indicator included in the message (e.g., sent via chatroom mode). The message transmission module 222 of application server(s) 218 will then transmit the message to client device 212 associated with a recipient (e.g., user 110B) of the message upon receipt of a request (e.g., agree to enter chatroom) from client device 212. The request could, for example, be automatic based on user 110B having indicated an availability for chatroom communications via client device 212. The message transmission module 222 may insert instructions in the message to instruct client device 212 to store the message in memory for only a specified time period and/or to display the message for only a specified time period (e.g., specified by the chatroom mode of operation of the client device) so that the messages are "ephemeral" messages. The message transmission module 222 may then delete the message from whichever of the server memories (durable and non-durable) it is currently stored on based on the specified time period expiring.

Data Flow

Figure 4:
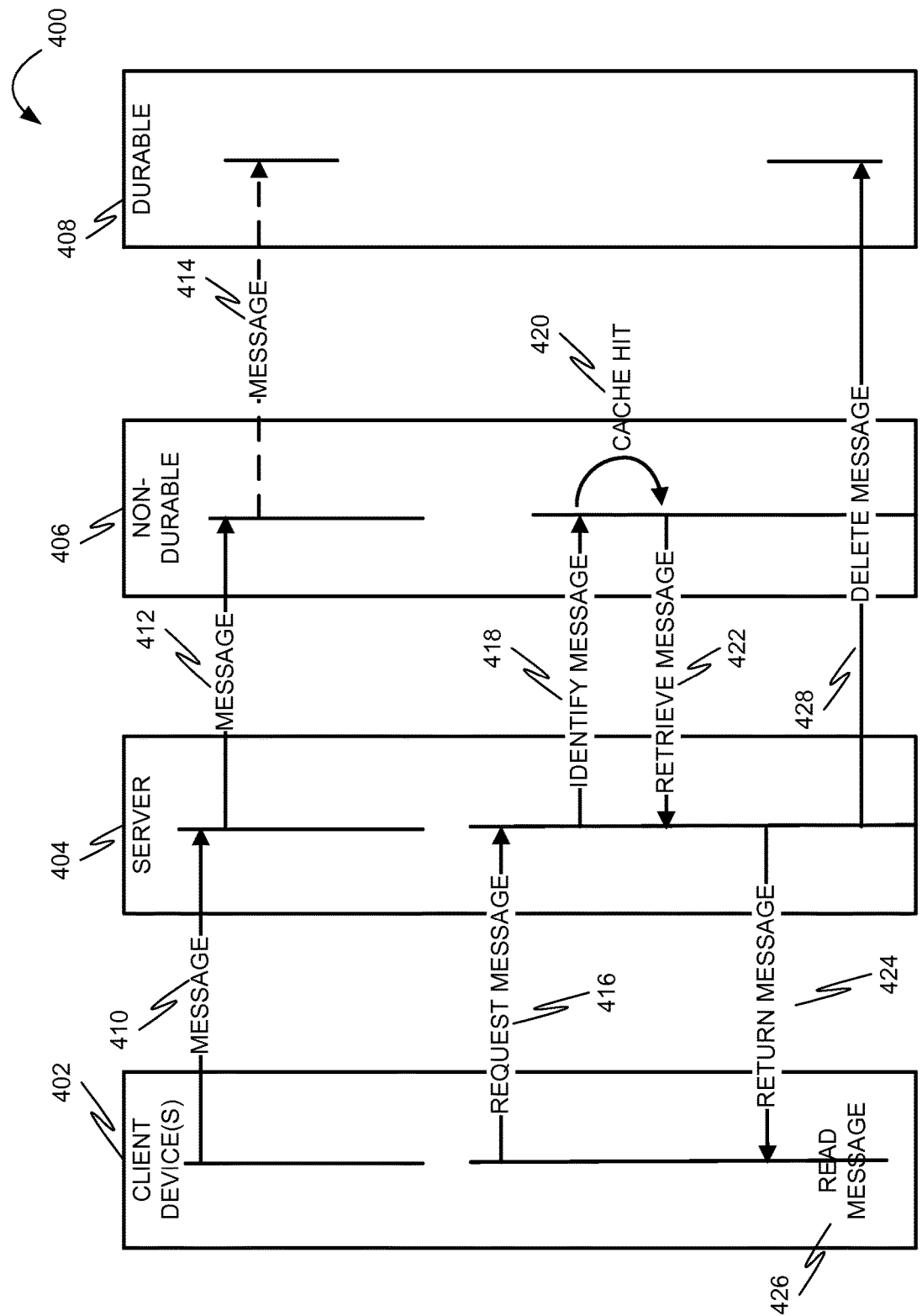
FIG. 4 is a ladder diagram illustrating a method, in accordance with an example embodiment, for processing and storing messages.

FIG. 4 is a ladder diagram illustrating a method, in accordance with an example embodiment, for processing and storing messages. A first client device (e.g., client device 210) of client device(s) 402 may be used to send a message to a second client device (e.g., client device 210) of client device(s) 402. At operation 410, the message (including an "short-term" indicator of short-term storage requirements) is sent to server 404 which stores the message in non-durable memory 406 (e.g., volatile memory such as a cache) for an extended time period at operation 412. The server 404 may, optionally, write the message to durable memory 408 at operation 414 if it is determined that an extended period of time associated with the "short-term" indicator has expired. At operation 416, the second client device(s) 402 may request to receive a copy of the message from the server 404. At operation 418, the server 404 may identify the stored message in the non-durable memory 406, e.g., if a copy is still stored in the cache because the extended time period has not expired. This is referred to as a "cache hit" 420 (since the non-durable memory may comprise a cache of volatile memory), as opposed to a "cache miss" if the requested message is not identified in the non-durable memory 406. If the server 404 experiences a "cache miss" then the server 404 proceeds to identify the requested message in durable memory 408 (e.g., a database including non-volatile memory).

In the example of FIG. 4, the server 404 does find a copy of the requested message in the cache 406 (cache hit 420) and proceeds to retrieve the requested message file from the non-durable memory 406 at operation 422. At operation 424, the server 404 returns the requested message file to the requesting client device(s) 402. The server 404 inserts instructions in the message so that the second client device of client device(s) 402 stores the message only for a specified time period and/or displays the message for only a specified period of time. At operation 426, requesting client device(s) 402 may read (e.g., view for at most the specified period of time) the received message. Finally, at operation 428 the server 404 may delete the message from the non-durable and/or the durable memory based on the message having been read by all the recipients, in this case read by the second client device of client device(s) 402.

Methods

Figure 5:
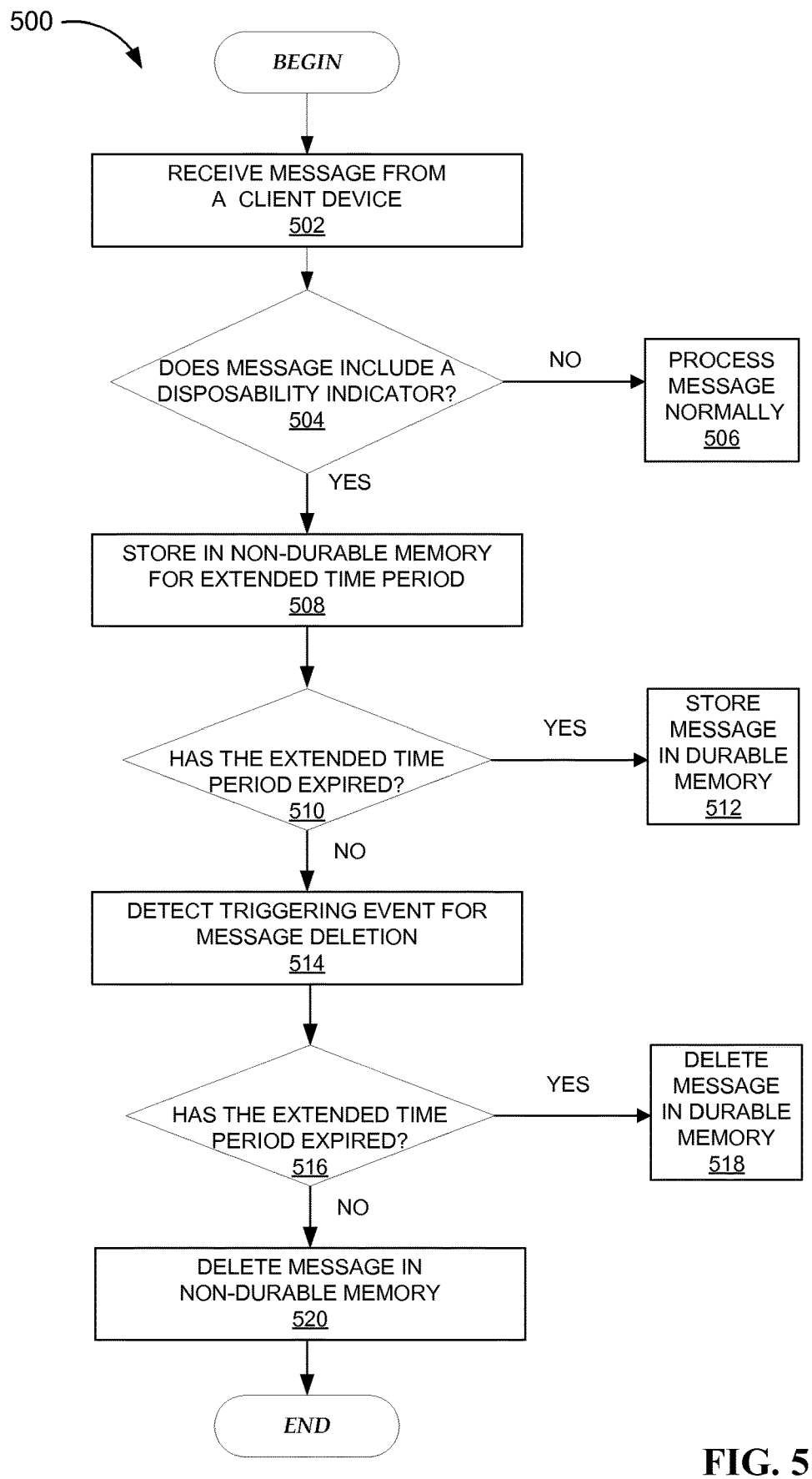
FIG. 5 shows a flow diagram illustrating one example embodiment of an operation of the message reception module.

FIG. 5 shows a flow diagram illustrating one example embodiment of a method 500 of the message reception module 220. At operation 502, a message reception module 220 of the application server(s) 218 receives a message from a first client device 210 that specifies a second client device 212 as a recipient. At operation 504, the message reception module 220 determines whether the message includes a "short-term" indicator of temporary storage requirements. At operation 506, the message reception module 220 processes the message normally (e.g., stored in non-durable memory for standard time period) based on no "short-term" indicator being included in the message. At operation 508, the message reception module 220 stores the message in a non-durable memory for an extended time period based on a "short-term" indicator included in the message. At operation 512, reception module 220 may, optionally, write the message to a durable memory based on a determination, at operation 510, that the extended period of time associated with the "short-term" indicator has expired. At operation 514, the message reception module 220 may detect a triggering event for deletion of the message. At operation 516, the message reception module 220 again determines whether the extended period of time associated with the "short-term"

indicator has expired. At operation 518, the message reception module 220 deletes the message from durable memory based on the extended period of time having expired. Finally at operation 520, the message reception module 220 deletes the message from non-durable memory based on the extended period of time not yet having expired.

Figure 6:
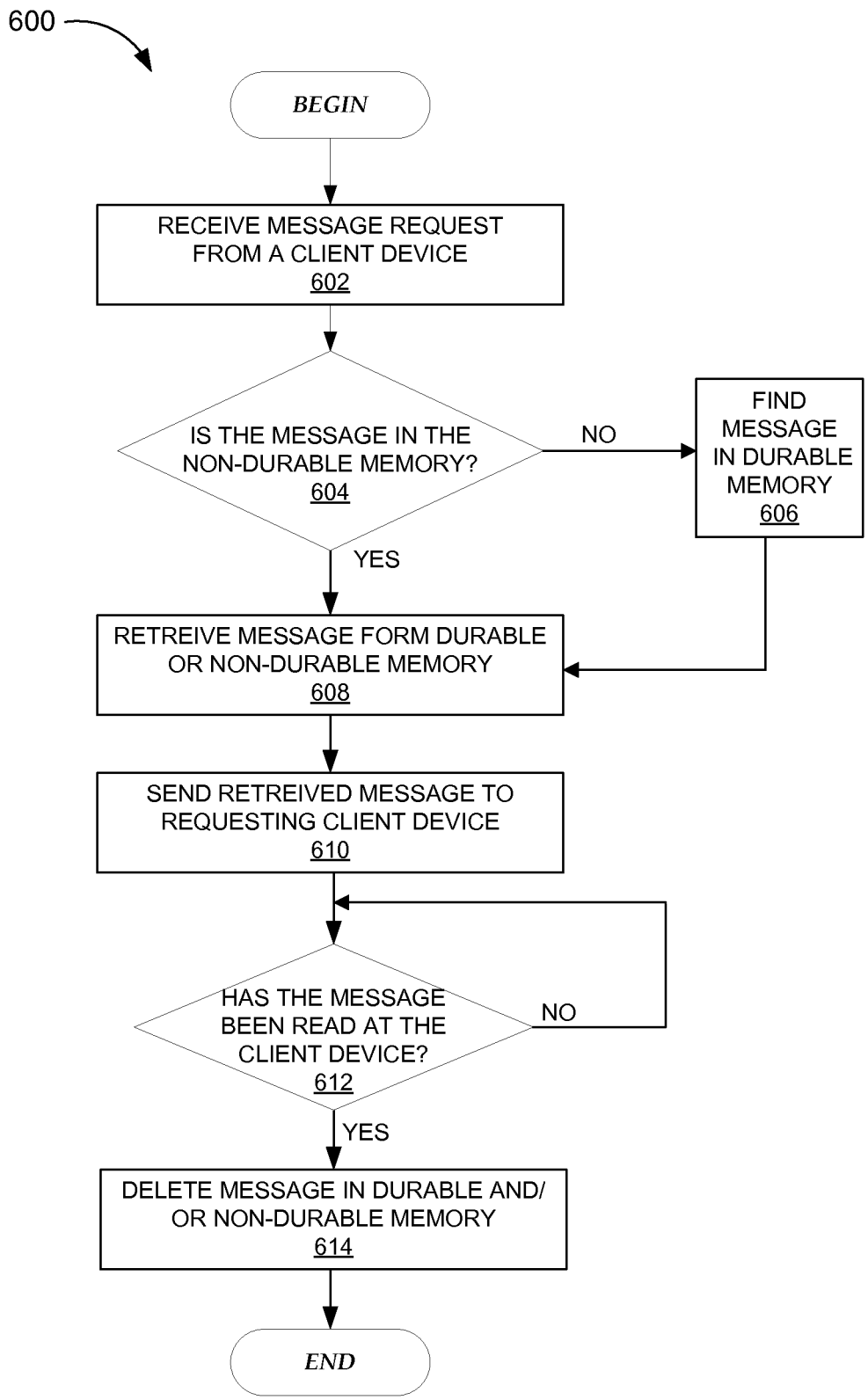
FIG. 6 shows a flow diagram illustrating one example embodiment of an operation of the message transmission module.

FIG. 6 shows a flow diagram illustrating one example embodiment of a method 600 of the message transmission module 222. At operation 602, the second client device 212 requests to receive a copy of the message from the application server(s) 218. At operation 604, the message transmission module 222 may identify the stored message in the non-durable memory, e.g., if the extended time period has not expired. At operation 606, if the message transmission module 222 cannot identify the requested message in the non-durable memory then the message transmission module 222 proceeds to identify the requested message in durable memory.

At operation 608, message transmission module 222 proceeds to retrieve the requested message file from the non-durable memory or the durable memory. At operation 610, the message transmission module 222 returns the requested message to the requesting second client device 212. The message transmission module 222 inserts instructions in the message so that the second client device of client device(s) 402 does not store the message and only displays the message for a specified period of time. At operation 612, requesting second client device 212 may read (e.g., view for at most the specified period of time) the received message. Finally, at operation 614 the message transmission module 222 may delete the message from the non-durable and/or the durable memory based on the message having been read by all the recipients, in this case read by the second client device 212.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respectively different hardware-implemented modules at different times. Software may, accordingly, configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via the network 104 (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product (e.g., a computer program tangibly embodied in an information carrier, e.g., in a machine-readable medium for execution by, or to control the operation of, data processing apparatus, e.g., a programmable processor, a computer, or multiple computers).

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed in various example embodiments.

Example Computer System

Figure 7:
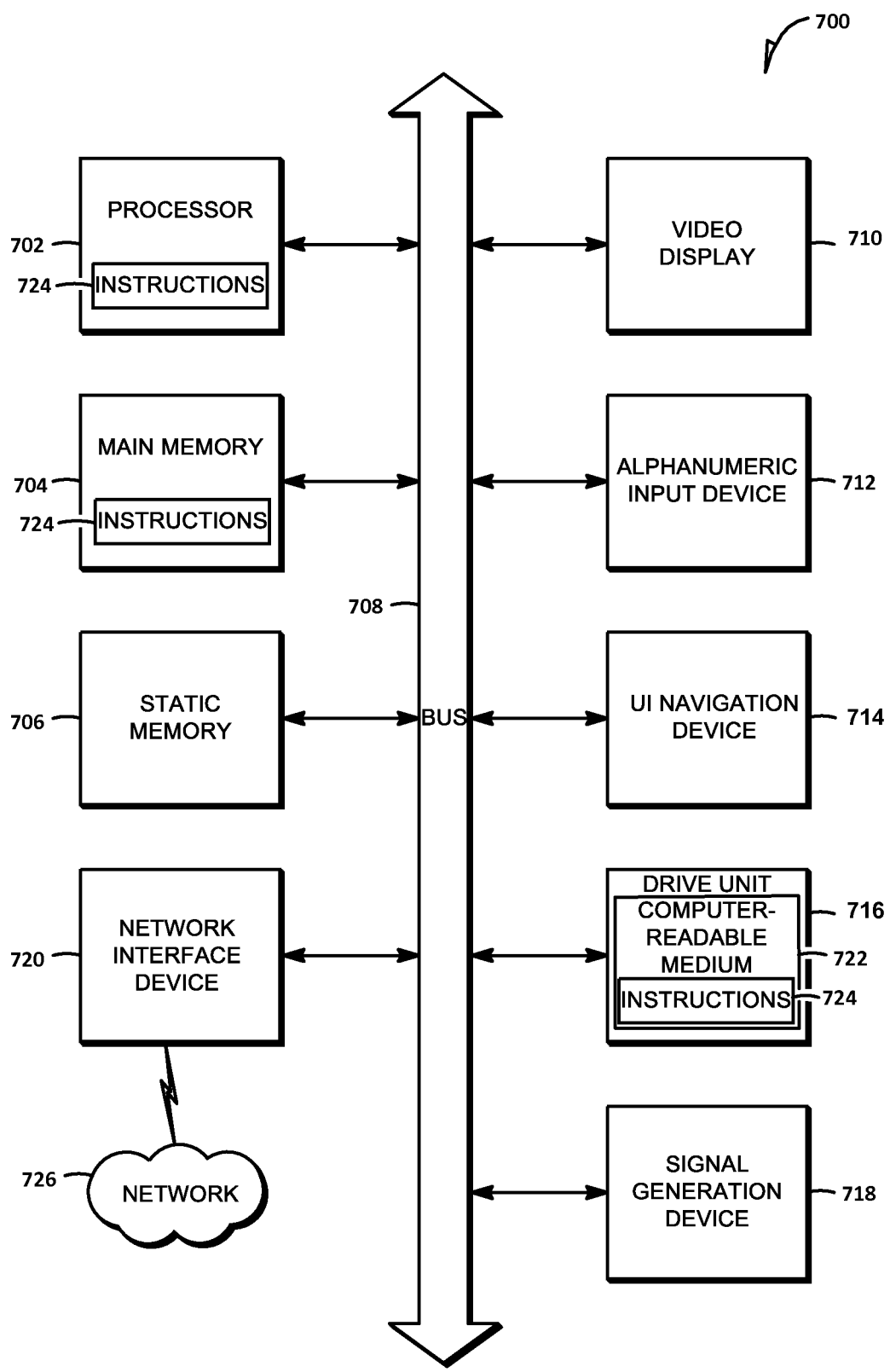
FIG. 7 shows a diagrammatic representation of machine, in the example form of a computer system, within which a set of instructions may be executed to cause the machine to perform any one or more of the methodologies discussed herein.

FIG. 7 shows a diagrammatic representation of a machine in the example form of a machine or computer system 700 within which a set of instructions 724 may be executed causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing a set of instructions 724 (sequential or otherwise) that specify actions to be taken by that machine. Further, while only a single machine is illustrated, the term "machine" shall also be taken to include any collection of machines that individually or jointly execute a set (or multiple sets) of instructions 724 to perform any one or more of the methodologies discussed herein.

The example computer system 700 includes a processor 702 (e.g., a central processing unit (CPU), a graphics processing unit (GPU), or both), a main memory 704, and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a UI navigation device 714 (e.g., a mouse), a drive unit 716, a signal generation device 718 (e.g., a speaker), and a network interface device 720.

The drive unit 716 includes a computer-readable medium 722 on which is stored one or more sets of data structures and instructions 724 (e.g., software) embodying or used by any one or more of the methodologies or functions described herein. The instructions 724 may also reside, completely or at least partially, within the main memory 704 or within the processor 702 during execution thereof by the computer system 700, with the main memory 704 and the processor 702 also constituting machine-readable photo.

The instructions 724 may further be transmitted or received over a network 726 via the network interface device 720 utilizing any one of a number of well-known transfer protocols (e.g., HTTP).

While the computer-readable medium 722 is shown in an example embodiment to be a single medium, the term "computer-readable medium" should be taken to include a single medium or multiple photo (e.g., a centralized or distributed database, and/or associated caches and servers) that store the one or more sets of instructions 724. The term "computer-readable medium" shall also be taken to include any medium that is capable of storing, encoding, or carrying a set of instructions 724 for execution by the machine that cause the machine to perform any one or more of the methodologies of the present disclosure, or that is capable of storing, encoding, or carrying data structures used by or associated with such a set of instructions 724. The term "computer-readable medium" shall, accordingly, be taken to include, but not be limited to, solid-state memories, optical photo, and magnetic photo.

Furthermore, the machine-readable medium is non-transitory in that it does not embody a propagating signal. However, labeling the tangible machine-readable medium "non-transitory" should not be construed to mean that the medium is incapable of movement—the medium should be considered as being transportable from one physical location to another. Additionally, since the machine-readable medium is tangible, the medium may be considered to be a machine-readable device.

Example Mobile Device

Figure 8:
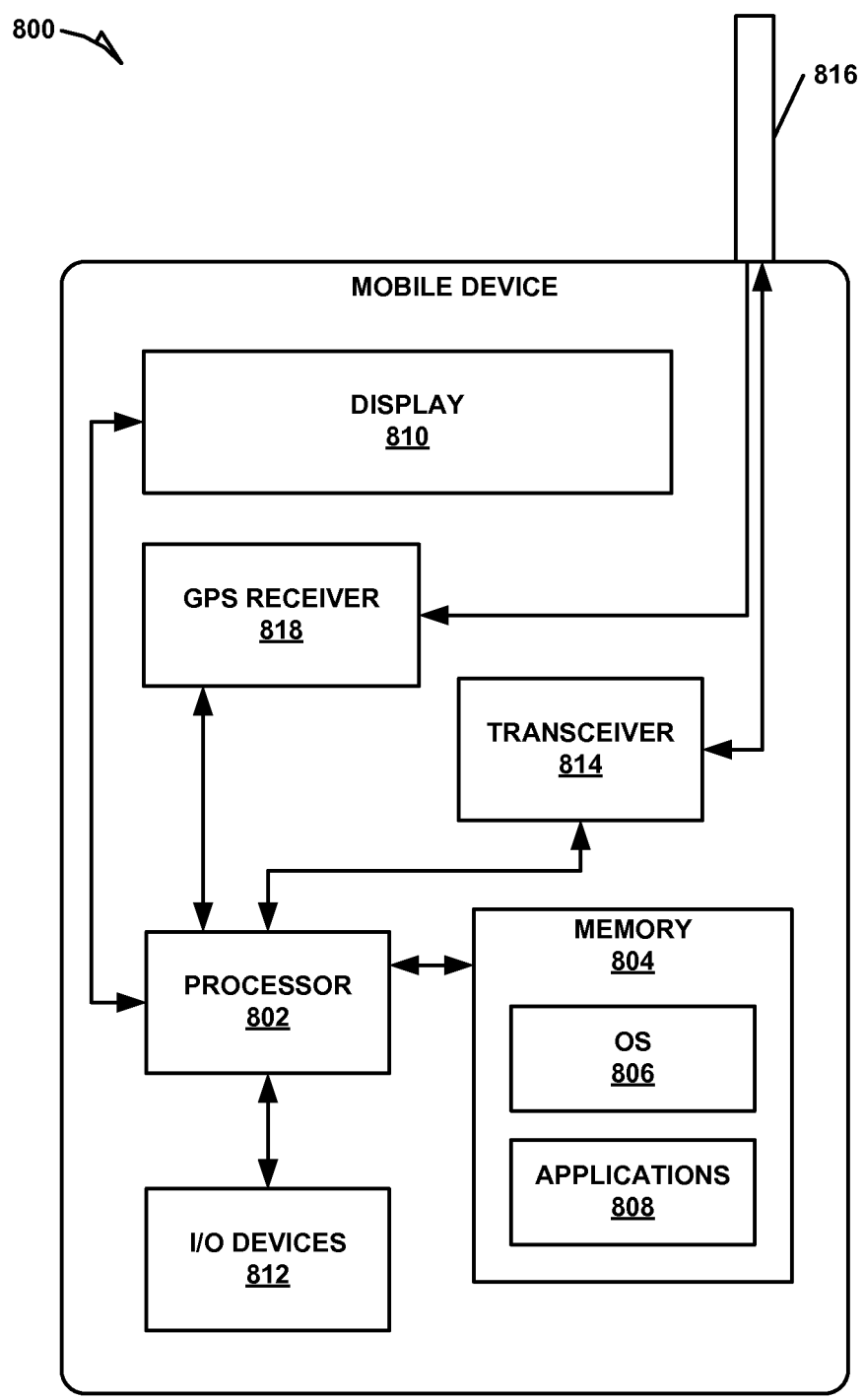
FIG. 8 is a block diagram illustrating a mobile device, according to an example embodiment.

FIG. 8 is a block diagram illustrating a mobile device 800, according to an example embodiment. The mobile device 800 may include a processor 802. The processor 802 may be any of a variety of different types of commercially available processors 802 suitable for mobile devices 800 (for example, an XScale architecture microprocessor, a microprocessor without interlocked pipeline stages (MIPS) architecture processor, or another type of processor 802). A memory 804, such as a random access memory (RAM), a flash memory, or another type of memory, is typically accessible to the processor 802. The memory 804 may be adapted to store an operating system (OS) 806, as well as applications 808, such as a mobile location enabled application that may provide location-based services (LBSs) to a user. The processor 802 may be coupled, either directly or via appropriate interphotory hardware, to a display 810 and to one or more input/output (I/O) devices 812, such as a keypad, a touch panel sensor, a microphone, and the like. Similarly, in some embodiments, the processor 802 may be coupled to a transceiver 814 that interfaces with an antenna 816. The transceiver 814 may be configured to both transmit and receive cellular network signals, wireless data signals, or other types of signals via the antenna 816, depending on the nature of the mobile device 800. Further, in some configurations, a GPS receiver 818 may also make use of the antenna 816 to receive GPS signals.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

Such embodiments of the inventive subject matter may be referred to herein, individually or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method comprising:
    receiving at a server an ephemeral electronic message from a first client device for transmission to a second client device associated with a recipient of the message upon receipt by the server of a request from the second client device, the ephemeral electronic message including a short-term indicator;
    storing the message in a non-durable memory of the server for an extended time period responsive to the short-term indicator; and
    deleting the message from the non-durable memory of the server without transmitting the message to the second client device, the deleting being performed based on an occurrence of a triggering event, the triggering event comprising a specified time period since transmitting the message to the second client device.

2. The method of claim 1, wherein the triggering event comprises automatically receiving an indication from the first client device.

3. The method of claim 1, wherein the indication comprises an indication that a user of the first client device has left a chatroom mode.

4. A method comprising:
    receiving at a server an ephemeral electronic message from a first client device for transmission to a second client device associated with a recipient of the message;
    transmitting the message to the second client device upon receipt by the server of a request from the second client device; and
    sending instructions from the server to the second client device to delete the message from the second client device prior to the recipient viewing the message on the second client device, the sending being performed based on an occurrence of a triggering event, the triggering event comprising a specified time period since transmitting the message to the second client device.

5. The method of claim 4, wherein the triggering event comprises automatically receiving an indication from the first client device.

6. The method of claim 4, wherein the indication comprises an indication that a user of the first client device has left a chatroom mode.

7. A non-transitory computer-readable medium storing program code which, when executed, is operative to cause a computing device to perform the steps of:
    receiving at the computing device an ephemeral electronic message from a first client device for transmission to a second client device associated with a recipient of the message;
    transmitting the message to the second client device upon receipt by the computing device of a request from the second client device; and sending instructions from the computing device to the second client device to delete the message from the second client device prior to the recipient viewing the message on the second client device, the sending being performed based on an occurrence of a triggering event, the triggering event comprising a specified time period since transmitting the message to the second client.

8. The non-transitory computer-readable medium of claim 7, wherein the triggering event comprises automatically receiving an indication from the first client device.

9. The non-transitory computer-readable medium of claim 7, wherein the indication comprises an indication that a user of the first client device has left a chatroom mode.

\* \* \* \* \*